United States Patent
Stroia et al.

(10) Patent No.: US 10,415,524 B2
(45) Date of Patent: Sep. 17, 2019

(54) VARIABLE SPRAY ANGLE INJECTOR ARRANGEMENT

(71) Applicant: CUMMINS INC., Columbus, IN (US)

(72) Inventors: Bradlee J. Stroia, West Granby, CT (US); Lester L. Peters, Columbus, IN (US); David L. Buchanan, Westport, IN (US); Rajesh K. Garg, Columbus, IN (US); Wei Ning, Columbus, IN (US)

(73) Assignee: Cummins Inc., Columbus, IN (US)

( * ) Notice: Subject to any disclaimer, the term of this patent is extended or adjusted under 35 U.S.C. 154(b) by 19 days.

(21) Appl. No.: 15/890,786

(22) Filed: Feb. 7, 2018

(65) Prior Publication Data

US 2018/0163594 A1    Jun. 14, 2018

Related U.S. Application Data (62) Division of application No. 14/592,490, filed on Jan. 8, 2015, now Pat. No. 9,920,674.

(Continued)

(51) Int. Cl.
*F02M 61/18* (2006.01)
*F02M 61/04* (2006.01)
(Continued)

(52) U.S. Cl.
CPC ......... *F02M 61/045* (2013.01); *F01N 3/2066* (2013.01); *F02B 23/0669* (2013.01); *F02M 61/184* (2013.01); *F02M 61/1813* (2013.01); *B01D 53/90* (2013.01); *F01N 2610/1453* (2013.01); *Y02T 10/125* (2013.01); *Y02T 10/24* (2013.01)

(58) Field of Classification Search
CPC .... F02M 61/045; F02M 61/042; F02M 61/10; F02M 61/18; F02M 61/184; F02M 61/1813; F02B 23/0669; Y02T 10/125
See application file for complete search history.

(56) References Cited

U.S. PATENT DOCUMENTS 1,342,486 A    6/1920    Wolfard
2,035,203 A    3/1936    Smith
(Continued)

FOREIGN PATENT DOCUMENTS

EP    0925440    6/1999
WO    2006077472    7/2006
(Continued)

*Primary Examiner* — Grant Moubry
*Assistant Examiner* — James G Moubry
(74) *Attorney, Agent, or Firm* — Faegre Baker Daniels LLP (57) ABSTRACT

An injector, comprising, an injector body comprising, an inner wall that defines an injector cavity for fluid, at least one inlet channel into the injector cavity, and at least one outlet channel from the injector cavity, a plunger that defines at least one passageway between the injector cavity and the at least one outlet channel, the plunger being movable longitudinally in the injector cavity between at least: a first open arrangement in which the at least one passageway is positioned to direct fluid into the at least one outlet channel at a first position, and a second open arrangement in which the at least one passageway is positioned to direct fluid into the at least one outlet channel at a second position different from the first position.

14 Claims, 11 Drawing Sheets

Related U.S. Application Data (60) Provisional application No. 61/925,376, filed on Jan. 9, 2014.

(51) Int. Cl.
   *F02B 23/06* (2006.01)
   *F01N 3/20* (2006.01)
   *B01D 53/90* (2006.01)

(56) References Cited

U.S. PATENT DOCUMENTS

| | | |
|---|---|---|
| 2,959,360 A | 11/1960 | Nichols |
| 4,077,374 A | 3/1978 | Willmann et al. |
| 4,195,783 A | 4/1980 | Hulsing |
| 4,365,746 A | 12/1982 | Tanasawa et al. |
| 4,408,722 A | 10/1983 | Frelund |
| 4,417,694 A | 11/1983 | Claxton et al. |
| 4,546,739 A | 10/1985 | Nakajima et al. |
| 4,750,675 A | 6/1988 | Sczomak |
| 4,813,610 A | 3/1989 | Renowden |
| 4,905,908 A | 3/1990 | Sczomak |
| 4,909,444 A | 3/1990 | Sczomak |
| 5,482,018 A | 1/1996 | Potz et al. |
| 5,497,947 A | 3/1996 | Potz et al. |
| 5,588,412 A | 12/1996 | Nozaki |
| 5,651,345 A | 7/1997 | Miller et al. |
| 5,671,716 A | 9/1997 | Hetrick et al. |
| 5,765,755 A | 6/1998 | Peters et al. |
| 5,836,521 A | 11/1998 | Holm et al. |
| 5,878,961 A | 3/1999 | Mueller et al. |
| 5,884,848 A | 3/1999 | Crofts et al. |
| 5,979,803 A | 11/1999 | Peters et al. |
| 6,036,120 A | 3/2000 | Varble et al. |
| 6,109,549 A | 8/2000 | Radue et al. |
| 6,189,817 B1 | 2/2001 | Lambert |
| 6,196,193 B1 | 3/2001 | Heinz et al. |
| 6,224,001 B1 | 5/2001 | Cooke et al. |
| 6,279,840 B1 | 8/2001 | Buckley |
| 6,302,080 B1 | 10/2001 | Kato et al. |
| 6,364,221 B1 | 4/2002 | Czimmek |
| 6,367,453 B1 | 4/2002 | Igashira et al. |
| 6,431,472 B1 | 8/2002 | Tian et al. |
| 6,467,702 B1 | 10/2002 | Lambert et al. |
| 6,513,487 B1 | 2/2003 | Jorach et al. |
| 6,578,778 B2 | 6/2003 | Koizumi et al. |
| 6,631,854 B1 | 10/2003 | Stier |
| 6,799,561 B2 | 10/2004 | Stewart et al. |
| 6,866,171 B2 | 3/2005 | Ickinger |
| 6,918,377 B2 | 7/2005 | Boltz |
| 7,086,377 B2 | 8/2006 | Best |
| 7,143,964 B2 | 12/2006 | Kuegler |
| 7,159,802 B2 | 1/2007 | Oomura et al. |
| 7,185,832 B2 | 3/2007 | Kaden et al. |
| 7,234,650 B2 | 6/2007 | Kuroyanagi et al. |
| 7,318,414 B2 | 1/2008 | Hou |
| 7,363,914 B2 | 4/2008 | Hoffmann et al. |
| 7,775,191 B2 | 8/2010 | Hou |
| 7,971,802 B2 | 7/2011 | Male et al. |
| 8,146,365 B2 | 4/2012 | Shum et al. |
| 8,215,287 B2 | 7/2012 | Lee |
| 8,496,191 B2 | 7/2013 | Grant et al. |
| 8,800,529 B2 | 8/2014 | Wickstone et al. |
| 9,062,642 B2 | 6/2015 | Peters et al. |
| 2002/0079378 A1 | 6/2002 | Boecking |
| 2003/0052203 A1 | 3/2003 | Arndt et al. |
| 2003/0201344 A1 | 10/2003 | Wark |
| 2008/0245902 A1* | 10/2008 | Hou ............. F02M 45/00 239/533.12 |
| 2009/0000600 A1 | 1/2009 | Sullivan |
| 2009/0145401 A1 | 6/2009 | Cooke |
| 2011/0186648 A1 | 8/2011 | Greeves et al. |
| 2011/0232606 A1 | 9/2011 | Peters et al. |
| 2012/0205469 A1 | 8/2012 | Shen et al. |
| 2015/0252767 A1 | 9/2015 | Peters et al. |

FOREIGN PATENT DOCUMENTS

| | | | |
|---|---|---|---|
| WO | 2009055315 | 4/2009 | |
| WO | WO 2009055315 A2 * | 4/2009 | ............ F02M 61/06 |

\* cited by examiner

VARIABLE SPRAY ANGLE INJECTOR ARRANGEMENT

CROSS-REFERENCE TO RELATED APPLICATIONS

The present application is a divisional of U.S. patent application Ser. No. 14/592,490, filed on Jan. 8, 2015, which claims priority to U.S. Provisional Patent Application Ser. No. 61/925,376, filed on Jan. 9, 2014, the complete disclosures of which are expressly incorporated by reference herein.

FIELD OF THE DISCLOSURE

The present disclosure relates to an injector for spraying fluid in various systems of internal combustion engines. More particularly, the present disclosure relates to injector having variable spray angles, and to methods for using the same.

BACKGROUND OF THE DISCLOSURE

Internal combustion engines typically include various systems, for example, combustion system, exhaust system, which may require an injector for spraying fluid. Combustion systems typically use injectors to spray fuel into combustion chambers of internal combustion engines and exhaust systems typically use injector to spray diesel exhaust fluid into decomposition reactor. Improved combustion systems, and exhaust systems are consistently required to meet the ever-increasing governmental and regulatory demands for emissions abatement (e.g., nitrogen oxides ($NO_x$), particulate matter (PM), and hydrocarbons (HC)) and increased fuel economy. One technique for improving combustion systems involves controlling the mixing of fuel sprays with air in combustion chambers based on engine load and engine speed, for example.

SUMMARY

According to an embodiment of the present disclosure, an injector body comprising:, an inner wall that defines an injector cavity for fluid, at least one inlet channel into the injector cavity, and at least one outlet channel from the injector cavity, a plunger that defines at least one passageway between the injector cavity and the at least one outlet channel, the plunger being movable longitudinally in the injector cavity between at least: a first open arrangement in which the at least one passageway is positioned to direct fluid into the at least one outlet channel at a first position, and a second open arrangement in which the at least one passageway is positioned to direct fluid into the at least one outlet channel at a second position different from the first position. According to one aspect of this embodiment, the first position is spaced longitudinally from the second position. According to another aspect of this embodiment, the at least one outlet channel has an inlet end, an outlet end, and a channel axis between the inlet end and the outlet end, and wherein the first position is located on a first side of the channel axis and the second position is located on a second side of the channel axis. In yet another aspect of this embodiment, the plunger is further movable to a closed arrangement in which the at least one passageway is prevented from directing fluid into the at least one outlet channel. According to yet another aspect of this embodiment, the inner wall of the injector body blocks the at least one passageway when the plunger is moved to the closed arrangement. In another aspect of this embodiment, the plunger is further movable to a third open arrangement in which the at least one passageway is positioned to direct fluid into the at least one outlet channel at a third position located longitudinally between the first and second positions. In yet another aspect of this embodiment, the at least one passageway is narrower than the at least one outlet channel.

In another embodiment of the present disclosure, the method comprising, positioning a plunger in a first open arrangement in a body having an outlet channel, directing fluid through the plunger in the first open arrangement and into a first side of the outlet channel to produce a first spray trajectory from the outlet channel, moving the plunger to a second open arrangement, and directing fluid through the plunger in the second open arrangement and into a second side of the outlet channel to produce a second spray trajectory from the outlet channel different from the first spray trajectory. Another aspect of this embodiment, with the plunger in the first open arrangement, the fluid has a first velocity distribution in the outlet channel, and with the plunger in the second open arrangement, the fluid has a second velocity distribution in the outlet channel different from the first velocity distribution. In yet another aspect of this embodiment, the first velocity distribution is biased toward the first side of the outlet channel and the second velocity distribution is biased toward the second side of the outlet channel. In another aspect of this embodiment, the outlet channel has a channel axis, the first spray trajectory having a first spray angle relative to a reference plane that is deeper than an angle between the channel axis and the reference plane, and the second spray trajectory having a second spray angle that is shallower than the channel axis. According to yet another aspect of this embodiment, the moving step is performed based on at least one engine operating condition. In another aspect of this embodiment, moving the plunger to a third open arrangement, and directing fluid through the plunger in the third open arrangement and into the outlet channel to produce a third spray trajectory from the outlet channel, wherein moving the plunger to the third open arrangement is performed based on at least one engine operating condition. According to another aspect of this embodiment, with the plunger in the third open arrangement, the fluid has a third velocity distribution in the outlet channel. Another to yet another aspect of this embodiment, the third velocity distribution is balanced between the first side and the second side of the outlet channel. In yet another aspect of this embodiment, the third spray trajectory has a third spray angle that follows the channel axis.

In yet another embodiment of the present disclosure, a combustion system comprising, a combustion chamber, a piston disposed in the combustion chamber, a injector having an injector body, the injector body comprising an inner wall that defines an injector cavity, at least one inlet channel into the injector cavity, and at least one outlet channel from the injector cavity, a plunger that defines at least one passageway between the injector cavity and the at least one outlet channel, the plunger being movable in the injector cavity between at least: a first open arrangement in which the at least one passageway is positioned to direct fluid into the at least one outlet channel at a first position, and a second open arrangement in which the at least one passageway is positioned to direct fluid into the at least one outlet channel at a second position different from the first position. According to another aspect of this embodiment, the first position is spaced longitudinally relative to a direction of movement of the plunger from the second position. According to yet another aspect of this embodiment, the at least one outlet channel has an inlet end, an outlet end, and a channel axis between the inlet end and the outlet end, and wherein the first position is located on a first side of the channel axis and the second position is located on a second side of the channel axis. In yet another aspect of this embodiment, the at least one passageway is narrower than the at least one outlet channel.

According to another embodiment of the present disclosure, an exhaust system, comprising a particulate filter, a decomposition reactor downstream of the particulate filter, a selective catalytic reduction system downstream of the decomposition reactor, and an injector having an injector body, the injector body comprising, an inner wall that defines an injector cavity, at least one inlet channel into the injector cavity and at least one outlet channel from the injector cavity, a plunger that defines at least one passageway between the injector cavity and the at least one outlet channel, the plunger being movable in the injector cavity between at least: a first open arrangement in which the at least one passageway is positioned to direct fluid into the at least one outlet channel at a first position, and a second open arrangement in which the at least one passageway is positioned to direct fluid into the at least one outlet channel at a second position different from the first position, wherein the injector is disposed in the decomposition reactor. According to one aspect of this embodiment, the first position is spaced longitudinally relative to a direction of movement of the plunger from the second position. According to another aspect of this embodiment, the at least one outlet channel has an inlet end, an outlet end, and a channel axis between the inlet end and the outlet end, and wherein the first position is located on a first side of the channel axis and the second position is located on a second side of the channel axis. According to yet another aspect of this embodiment, the at least one passageway is narrower than the at least one outlet channel.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
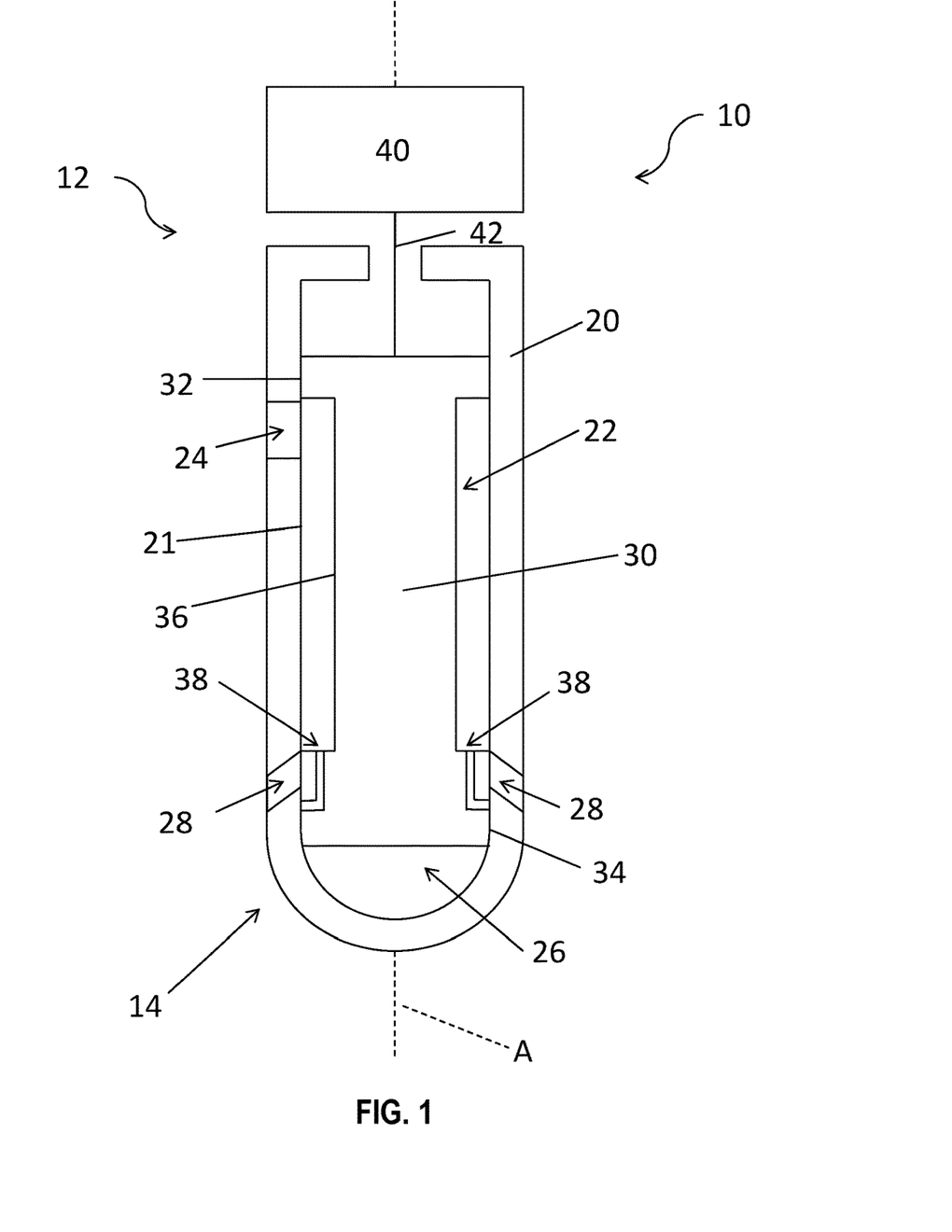
FIG. 1 is a schematic cross-sectional view of an exemplary injector of the present disclosure having an injector body with a plurality of outlet channels and a plunger with a plurality of passageways, the plunger shown in a closed arrangement.

Referring initially to FIG. 1, an injector 10 is illustrated schematically. The injector is configured to inject fuel into a combustion chamber 1308 (FIG. 13) of an internal combustion engine (not shown) or diesel exhaust fluid into decomposition reactor of an exhaust system of an internal combustion system (not shown). Injector 10 has first end 12, a second end 14, and a longitudinal axis A. First end 12 of injector 10 may be an upper end that is spaced outwardly relative to the combustion chamber 1308, and second end 14 of injector 10 may be a lower end that is spaced inwardly relative to combustion chamber 1308.

Figure 13:
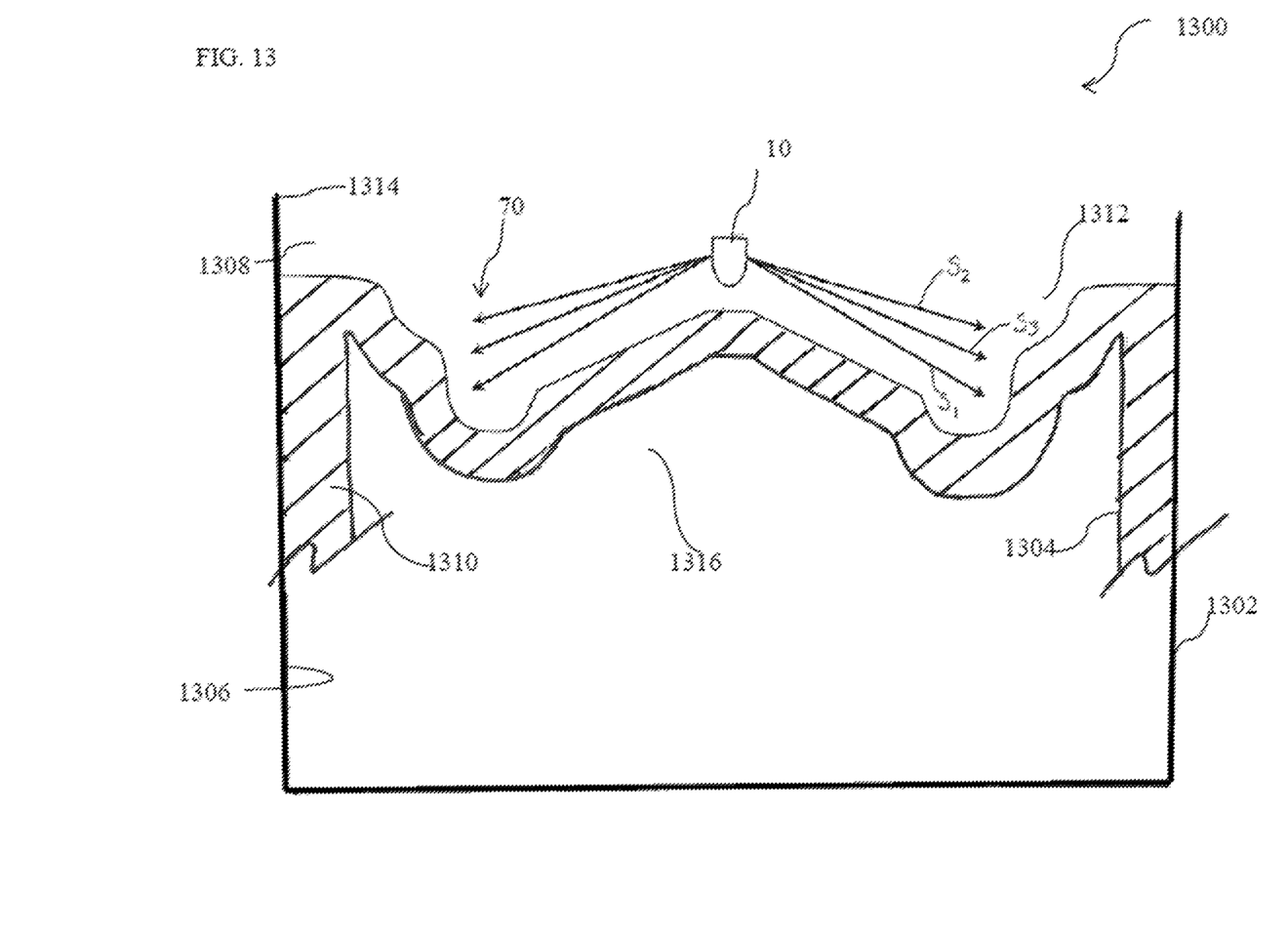
FIG. 13 is a schematic view of the injector spraying the first, second, and third fuel trajectories of FIGS. 7, 9, and 11 into a combustion chamber.

The illustrative injector 10 includes an elongate injector body 20. Although injector body 20 is shown as a unitary construct in FIG. 1, injector body 20 may be constructed of a plurality of individual pieces assembled together. Injector body 20 includes an inner wall 21 that defines an injector cavity 22 to receive fluid. Near the first or upper end 12, injector 10 includes at least one inlet channel 24 for receiving fluid from a fluid supply circuit or rail (not shown) and directing the fluid into injector cavity 22. Near the second or lower end 14, injector 10 includes a sac 26 with at least one outlet channel 28, illustratively a plurality of radially-spaced outlet channels 28, for delivering fluid from injector cavity 22 to combustion chamber 1308 (FIG. 13).

The illustrative injector 10 also includes a plunger 30 in injector cavity 22. Plunger 30 may also be referred to herein as a needle or nozzle valve, for example. The illustrative plunger 30 includes a head 32 arranged toward first end 12 of injector 10, a tip 34 arranged toward second end 14 of injector 10, and a shaft 36 extending therebetween. Tip 34 of plunger 30 defines at least one passageway 38, illustratively a plurality of radially-spaced passageways 38, arranged in fluid communication with injector cavity 22.

Plunger 30 may be configured for reciprocal and longitudinal movement in injector cavity 22 between at least one closed arrangement and a plurality of open arrangements. Plunger 30 is shown in a closed arrangement in FIG. 1. In this closed arrangement, passageways 38 do not communicate with outlet channels 28. Instead, passageways 38 interface with inner wall 21 of injector body 20, which prevents fluid in injector cavity 22 from reaching outlet channels 28 via passageways 38. Plunger 30 may be biased in this closed arrangement, such as using a spring (not shown). Plunger 30 is shown in three different open arrangements in FIGS. 2-4.

In each open arrangement, tip 34 of plunger 30 is moved longitudinally relative to the closed arrangement to place passageways 38 in fluid communication with outlet channels 28, which allows fluid in injector cavity 22 to reach outlet channels 28 via passageways 38. These open arrangements are described further below.

The illustrative injector 10 further includes an actuating system 40 operably coupled to plunger 30 to control movement of plunger 30 in injector cavity 22 between the open and closed arrangements. Actuating system 40 may control movement of plunger 30 based on one or more engine operating conditions (e.g., engine load, engine speed). Actuating system 40 may include a solenoid actuator, a piezoelectric actuator, a magnetostrictive actuator, or another suitable actuator for controlling movement of plunger 30. Such actuators may interact with head 32 of plunger 30 via a suitable link 42, which may be a mechanical link and/or a hydraulic link, for example. Suitable actuating systems 40 are disclosed in U.S. Patent Application Publication Nos. 2011/0232606 and 2013/0270369, for example, the disclosures of which are expressly incorporated herein by reference in their entirety.

Figure 4:
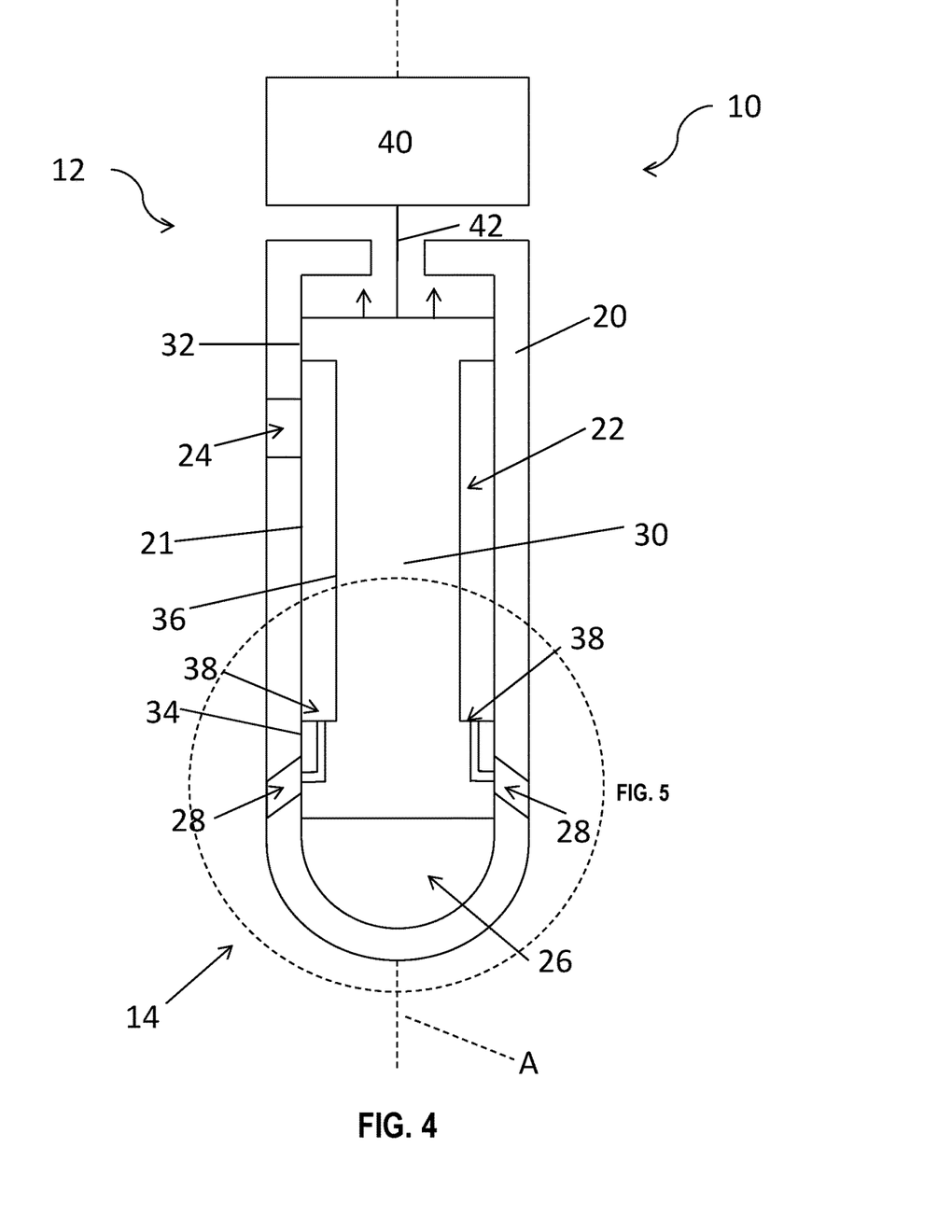
FIG. 4 is yet another schematic cross-sectional view of the injector of FIG. 1 shown with the plunger in a third open arrangement.
Figure 5:
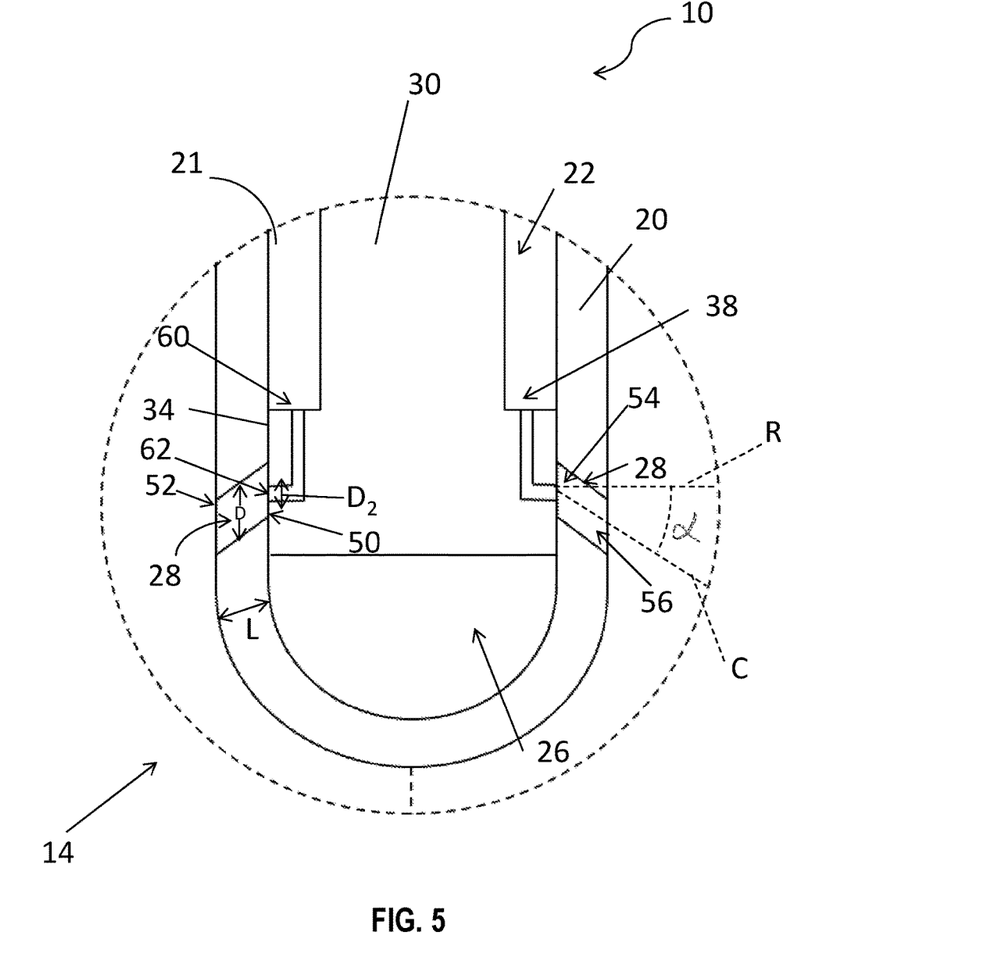
FIG. 5 is a detailed view of the circled portion of the injector of FIG. 4.

The second or lower end 14 of injector 10, which includes outlet channels 28 in injector body 20 and passageways 38 in plunger 30, is shown in more detail in FIG. 5. FIG. 5 corresponds to the open arrangement of FIG. 4, with passageways 38 being shown in fluid communication with outlet channels 28.

Each outlet channel 28 has an inlet end 50 and an outlet end 52, and each passageway 38 has an inlet end 60 and an outlet end 62. When plunger 30 is in an open arrangement, as shown in FIG. 5, outlet end 62 of passageway 38 is positioned in fluid communication with inlet end 50 of the corresponding outlet channel 28. By contrast, when plunger 30 is in a closed arrangement, as shown in FIG. 1, plunger 30 interacts with inner wall 21 of injector body 20 to interrupt fluid communication between outlet end 62 of passageway 38 and inlet end 50 of the corresponding outlet channel 28.

Figure 6A:
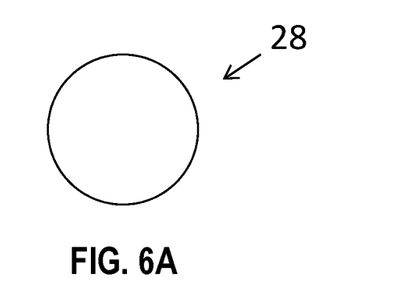
FIGS. 6A-6C are cross-sectional views of various outlet channels.
Figure 6B:
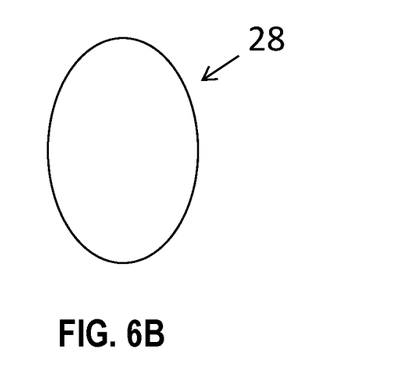
Figure 6C:
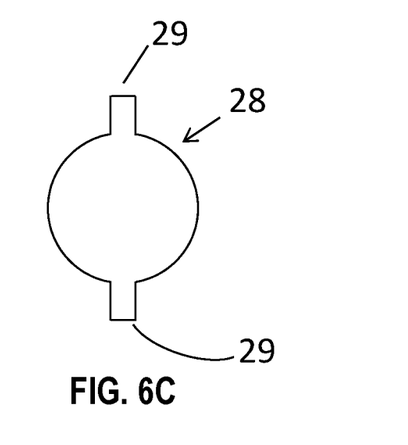

The size, shape, and orientation of each outlet channel 28 and passageway 38 may vary. With respect to outlet channel 28 of FIG. 5, for example, the diameter $D_1$, the length L, and the channel angle α between channel axis C and reference plane R may vary. The cross-sectional shape of each outlet channel 28 may also vary. For example, outlet channel 28 may be circular in cross-section, as shown in FIG. 6A, oval in cross-section, as shown in FIG. 6B, and/or may include one or more radial extensions 29, as shown in FIG. 6C. With respect to passageway 38 of FIG. 5, for example, the diameter $D_2$ and the generally L-shaped pathway may vary. The number of outlet channels 28 and passageways 38 may also vary. Outlet channels 28 and passageways 38 may be formed by abrasive flow machining (AFM), electric discharge machining (EDM), laser machining, or other suitable manufacturing methods.

In the direction of longitudinal axis A of injector 10, each outlet channel 28 may have at least a first side 54 and a second side 56. In the illustrated embodiment of FIG. 5, first side 54 of outlet channel 28 is the upper half or "high side" of outlet channel 28 that is located above channel axis C, and second side 56 of outlet channel 28 is the lower half or "low side" of outlet channel 28 that is located below channel axis C. First side 54 and second side 56 of the illustrative outlet channel 28 are arranged in fluid communication with one another, such that fluid in first side 54 of outlet channel 28 may travel to second side 56 of outlet channel 28, and vice versa.

Outlet end 62 of each passageway 38 may be smaller in size (i.e., narrower) than inlet end 50 of the corresponding outlet channel 28. For example, as shown in FIG. 5, diameter $D_2$ at outlet end 62 of passageway 38 may be smaller than diameter $D_1$ at inlet end 50 of the corresponding outlet channel 28. In this manner, outlet end 62 of passageway 38 may be moved to a plurality of different open arrangements between first side 54 and second side 56 of the corresponding outlet channel 28, as shown in FIGS. 2-4.

Figure 2:
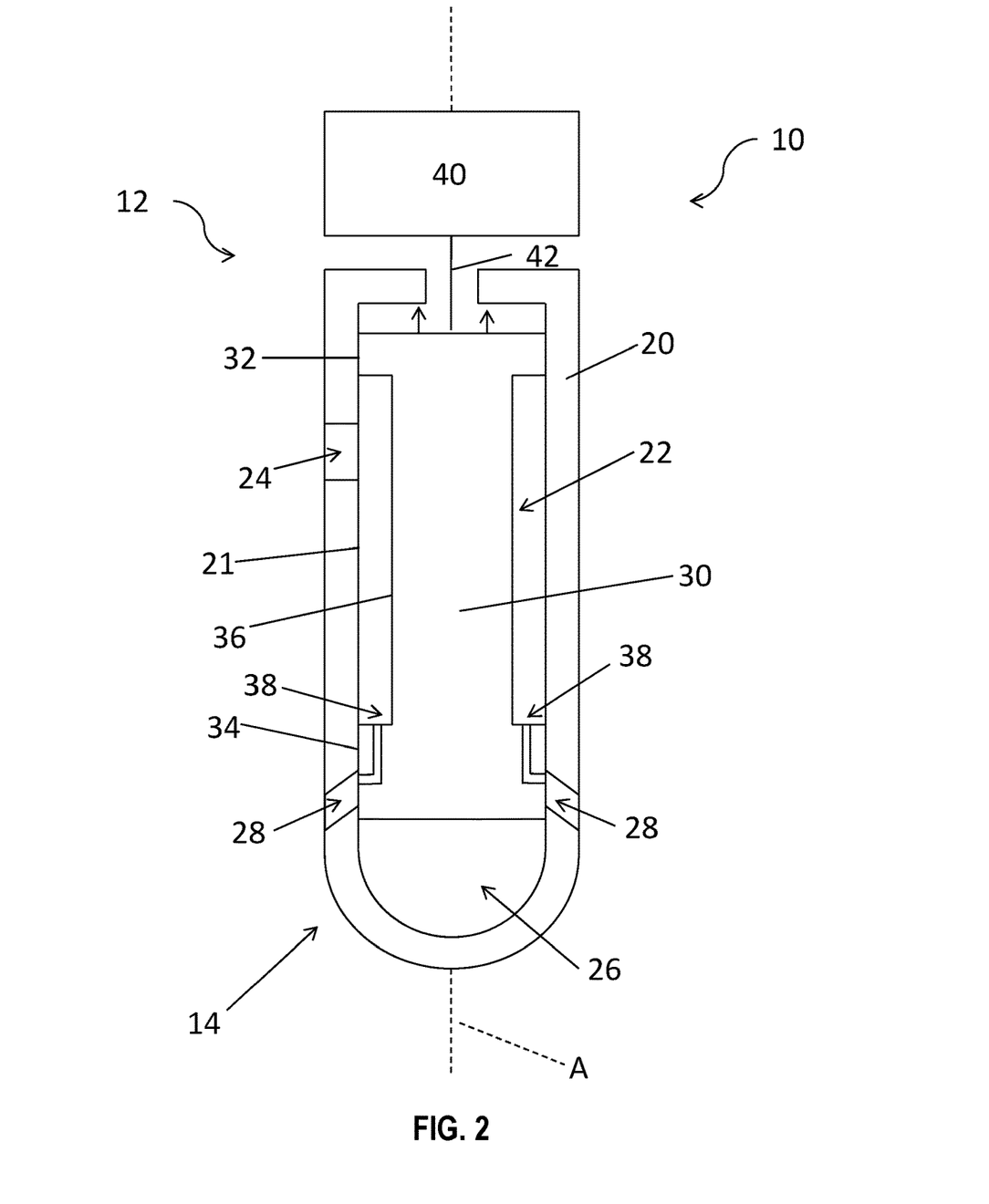
FIG. 2 is another schematic cross-sectional view of the injector of FIG. 1 shown with the plunger in a first open arrangement.
Figure 3:
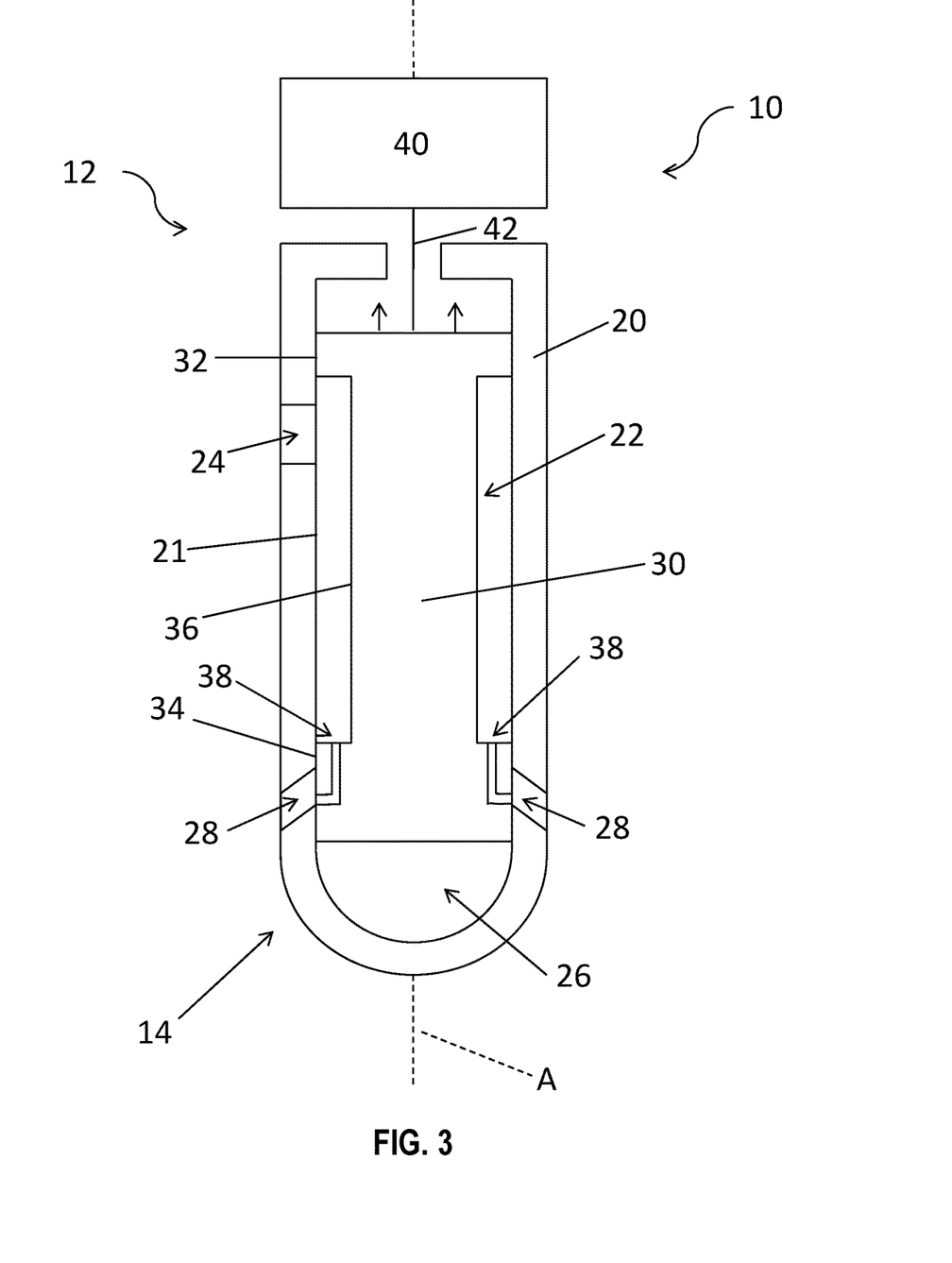
FIG. 3 is yet another schematic cross-sectional view of the injector of FIG. 1 shown with the plunger in a second open arrangement.

By moving plunger 30 between the plurality of different open arrangements shown in FIGS. 2-4, actuating system 40 may control the position of each passageway 38 relative to each outlet channel 28. As a result, actuating system 40 may also control the introduction of fluid into inlet end 50 of each outlet channel 28 from outlet end 62 of each passageway 38, the velocity distribution of the fluid within each individual outlet channel 28, and the trajectory of the resulting fluid spray from outlet end 52 of each outlet channel 28. This trajectory control method is described further below with reference to FIGS. 7-12.

Figure 7:
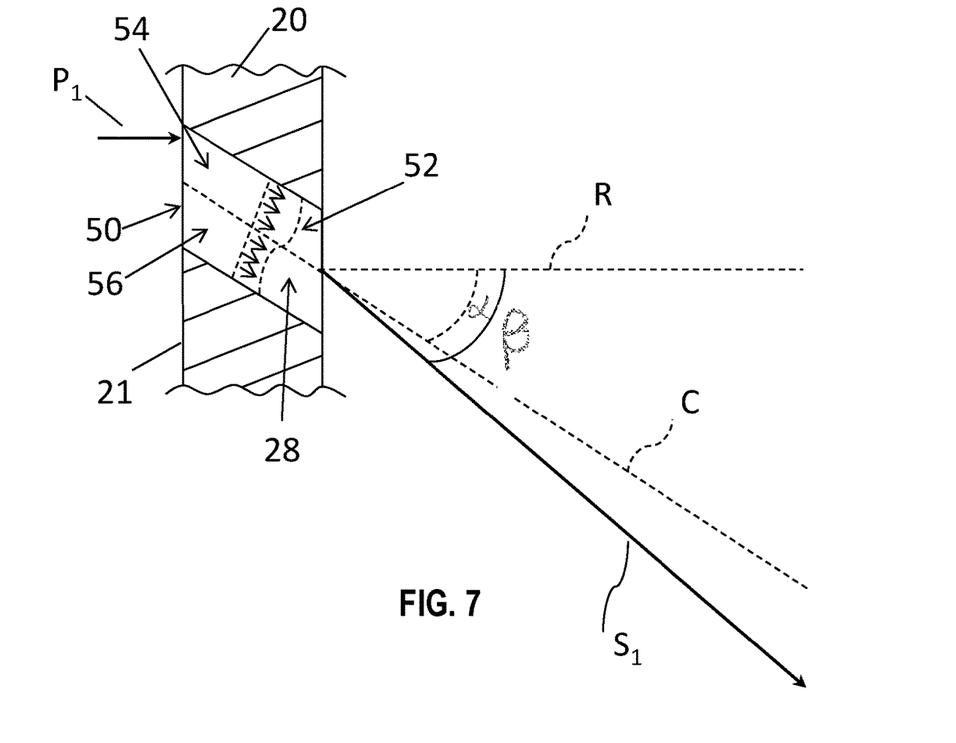
FIG. 7 shows a first schematic fluid trajectory corresponding to the first open arrangement of FIG. 2.
Figure 8:
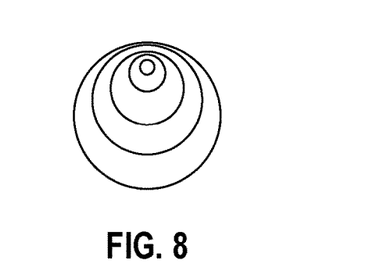
FIG. 8 shows a first schematic velocity distribution for the fluid of FIG. 7.

A first spray trajectory or axis $S_1$ from outlet channel 28 is described with reference to FIG. 7 (which corresponds to the first open arrangement of FIG. 2). In this arrangement, fluid is introduced to inlet end 50 of outlet channel 28 at a first position $P_1$ corresponding to first side 54 (i.e., the "high side") of outlet channel 28. Some of the fluid may travel to second side 56 (i.e., the "low side") of outlet channel 28 before reaching outlet end 52. Upon reaching outlet end 52, the fluid in first side 54 of outlet channel 28 may be traveling faster than the fluid in second side 56 of outlet channel 28. In other words, the velocity distribution at outlet end 52 may be biased toward first side 54 of outlet channel 28, which may be referred to herein as a "biased high" velocity distribution. A "biased high" velocity distribution is shown schematically in FIG. 8. Upon exiting outlet end 52, the "biased high" velocity distribution may cause the resulting fluid spray to travel downwardly relative to channel axis C along a first spray axis $S_1$, as shown in FIG. 7. The first spray angle of the first spray axis $S_1$ may be deeper than the channel angle α of the channel axis C relative to the reference plane R.

Figure 9:
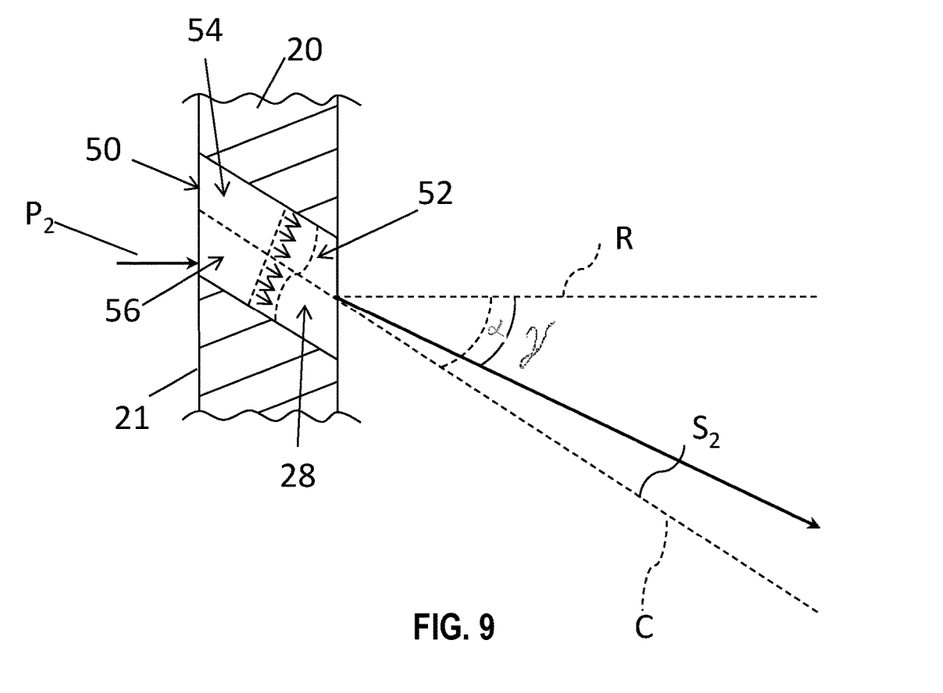
FIG. 9 shows a second schematic fluid trajectory corresponding to the second open arrangement of FIG. 3.
Figure 10:
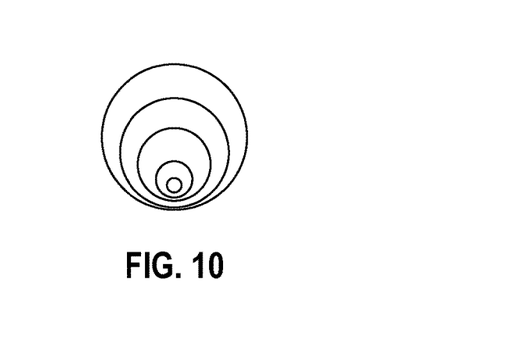
FIG. 10 shows a second schematic velocity distribution for the fluid of FIG. 9.

A second spray trajectory or axis $S_2$ from outlet channel 28 is described with reference to FIG. 9 (which corresponds to the second open arrangement of FIG. 3). In this arrangement, fluid is introduced to inlet end 50 of outlet channel 28 at a second position $P_2$ corresponding to second side 56 (i.e., the "low side") of outlet channel 28. Some of the fluid may travel to first side 54 (i.e., the "high side") of outlet channel 28 before reaching outlet end 52. Upon reaching outlet end 52, the fluid in second side 56 of outlet channel 28 may be traveling faster than the fluid in first side 54 of outlet channel 28. In other words, the velocity distribution at outlet end 52 may be biased toward second side 56 of outlet channel 28, which may be referred to herein as a "biased low" velocity distribution. A "biased low" velocity distribution is shown schematically in FIG. 10. Upon exiting outlet end 52, the "biased low" velocity distribution may cause the resulting fluid spray to travel upwardly relative to channel axis C along a second spray axis $S_2$, as shown in FIG. 9. The second spray angle γ of the second spray axis $S_2$ may be shallower than the channel angle α of the channel axis C relative to the reference plane R.

Figure 11:
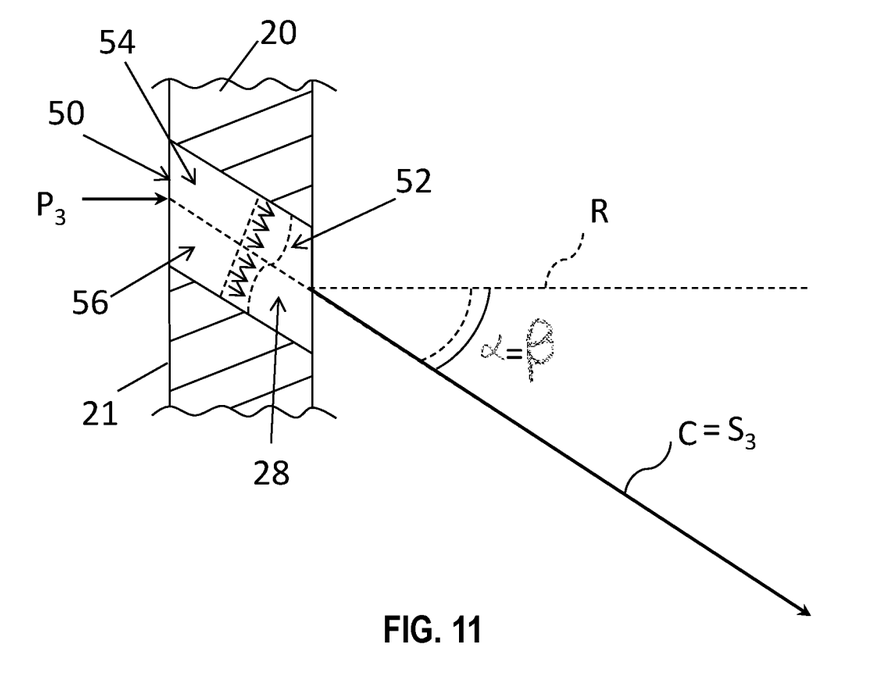
FIG. 11 shows a third schematic fluid trajectory corresponding to the third open arrangement of FIG. 4.
Figure 12:
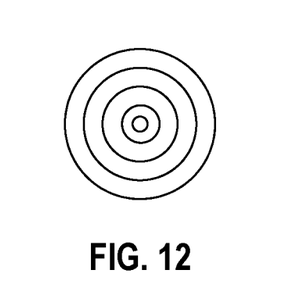
FIG. 12 shows a third schematic velocity distribution for the fluid of FIG. 11.

A third spray trajectory or axis $S_3$ from outlet channel 28 is described with reference to FIG. 11 (which corresponds to the third open arrangement of FIG. 4). In this arrangement, fluid is introduced to inlet end 50 of outlet channel 28 at a third position $P_3$ corresponding to channel axis C between first side 54 and second side 56. The velocity distribution at outlet end 52 may be substantially balanced between first side 54 and second side 56, which may be referred to herein as a "balanced" velocity distribution. A "balanced" velocity distribution is shown schematically in FIG. 12. Upon exiting outlet end 52, the "balanced" velocity distribution may cause the third spray axis $S_3$ to generally follow channel axis C, as shown in FIG. 11. The third spray angle δ of the third spray axis $S_3$ may be equal to the channel angle α of the channel axis C relative to the reference plane R.

In summary, by introducing fluid to each outlet channel 28 at a desired position $P_1$, $P_2$, $P_3$, the resulting fluid spray from each outlet channel 28 may be delivered along a desired spray trajectory or axis $S_1$, $S_2$, $S_3$. It is also within the scope of the present disclosure to introduce fluid to each outlet channel 28 at a plurality of positions other than (e.g., between) the above-described positions $P_1$, $P_2$, $P_3$ to produce additional fluid spray trajectories. Although the illustrated fluid spray trajectories $S_1$, $S_2$, $S_3$ are linear, the fluid spray trajectories $S_1$, $S_2$, $S_3$ may bend or curve in a non-linear manner.

Referring next to FIG. 13, a combustion system 1300 according to one embodiment of the present disclosure is depicted as including the injector 10 (not fully shown), a cylinder 1302, and a piston 1304. Cylinder 1302 generally includes a cylinder cavity 1306 and piston 1304. Cylinder 1302 is generally formed in an engine block (not shown). A cylinder head (not shown) is positioned on a top surface 1314 of cylinder 1302. The bottom surface of the cylinder head attaches to engine block closing cylinder 1302 from its top surface 1314 and forming a combustion chamber 1308. Piston 1304 is slidably disposed within the cylinder 1302. It should be understood that while piston 1304 is shown in FIG. 13, in certain embodiments, piston 1304 may have different shape without affecting implementation of the present disclosure. The cylinder head includes an exhaust passage (not shown), an intake passage (not shown) and an injector bore (not shown). Injector 10 is securely mounted into the injector bore formed within the cylinder head for injecting fuel in combustion chamber 1308. The exhaust passage formed in the cylinder head directs exhaust gases from combustion chamber 1308 and an intake passage directs intake air into combustion chamber 1308.

The piston 1304 generally includes a depending cylindrical wall 1310, a top surface 1314, a piston crown 1312, and lower surface 1316. Top surface of piston 1304 cooperates with the cylinder head and a portion of cylinder 1302 that extends between the cylinder head and piston 1304 to define combustion chamber 1308. Although not specifically shown in FIG. 13, piston 1304 is connected to a crankshaft by way of a connecting rod which translates reciprocal movement of piston 1304 along a rectilinear path within cylinder 1302 into rotational movement of the crankshaft in a manner that is well known in the art.

Still referring to FIG. 13, an upper portion of piston 1304 is referred to as piston crown 1312. Injector 10 is slidably disposed within the cylinder 1302. Piston crown 1312 is configured to receive fuel from injector 10. The desired spray trajectory $S_1$, $S_2$, $S_3$ (as shown) may be chosen to control the interaction between the fuel spray and the air in piston crown 1312 of combustion chamber 1308. In operation, actuating system 40 may be configured to move plunger 30 (FIG. 1) based on one or more engine operating conditions (e.g., engine load, engine speed) to target a certain feature or location of piston crown 1312 with the desired spray trajectory $S_1$, $S_2$, $S_3$. Such targeting between the fuel spray and the air in combustion chamber 1308 may minimize emissions and improve fuel economy.

Figure 14:
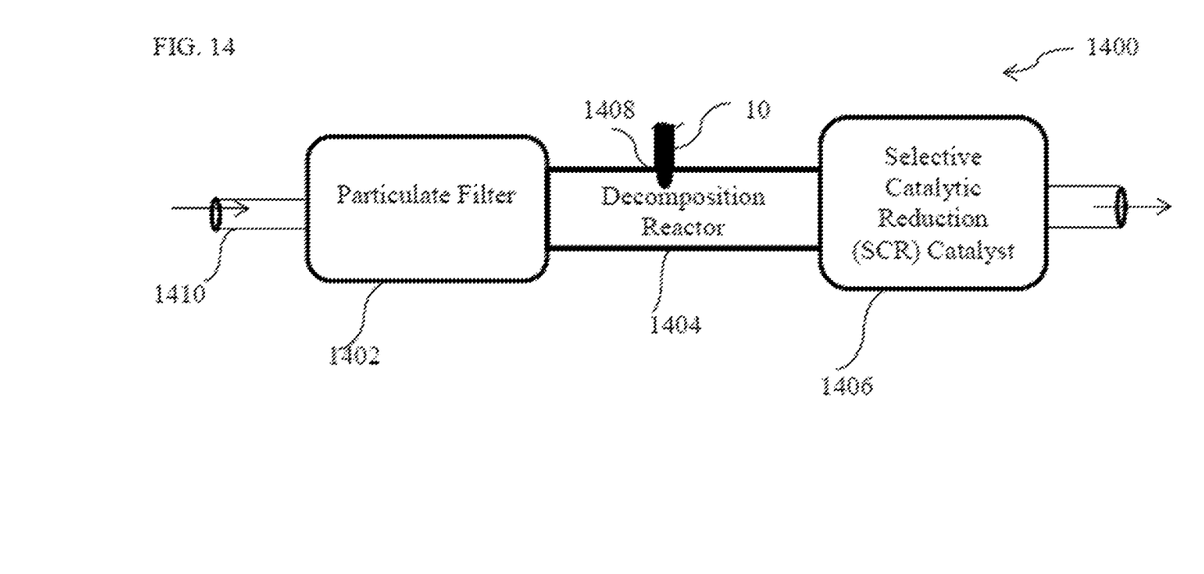
FIG. 14 is a schematic view showing an exhaust system with the injector of FIG. 1.

Referring now to FIG. 14, an exhaust system 1400 according to one embodiment of the present disclosure is depicted as including the injector 10 (not fully shown), a particulate filter 1402, a decomposition reactor 1404, and a selective catalytic reduction (SCR) catalyst 1406. Decomposition reactor 1404 is connected downstream to particulate filter 1402 and upstream to the SCR catalyst 1406. The decomposition reactor 1404 includes a diesel exhaust fluid (DEF) dosing valve 1408 which is connected to a tank (not shown) containing DEF. Injector 10 is disposed into the DEF dosing valve 1408. Particulate filter 1402 is connected to exhaust passage (not shown) via an exhaust line 1410.

Operationally, exhaust from the combustion chamber 1308 (FIG. 13) enters into particulate filter 1402 over a diesel oxidation catalyst into a wall-flow filter. Carbon particles are contained in the wall-flow filter. Nitric oxide in exhaust is converted into nitrogen dioxide ($NO_2$) in the diesel oxidation catalyst. As nitrogen dioxide ($NO_2$) flows through the wall-flow filter, it reacts with carbon (in wall-flow filter) to produce carbon dioxide ($CO_2$) and nitrogen oxide (NO). As the exhaust passes into the decomposition reactor, injector 10 sprays a small amount of DEF into hot exhaust stream 1404 forming ammonia ($NH_3$), through a series of reactions. Together nitrogen oxide (NO) and ammonia ($NH_3$) passes through SCR catalyst 1406 forming water vapor and nitrogen. As explained above with reference to FIG. 13, actuating system 40 may be configured to move plunger 30 (FIG. 1) based on one or more engine operating conditions (e.g., engine load, engine speed) to target a certain feature or location in decomposition reactor 1404 with the desired spray trajectory $S_1$, $S_2$, $S_3$. It should be understood that while combustion system 1300 and exhaust system 1400 are described hereinabove as having the injector 10, in certain embodiments, injector 10 may be positioned in other systems, for example, liquid hydrocarbon dosing systems, without affecting implementation of the present disclosure.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A method, comprising:
  positioning a plunger in a first open arrangement in a body having an outlet channel;
  directing fluid through the plunger in the first open arrangement and into a first side of the outlet channel to produce a first spray trajectory from the outlet channel;
  moving the plunger to a second open arrangement; and
  directing fluid through the plunger in the second open arrangement and into a second side of the same outlet channel to produce a second spray trajectory from the outlet channel different from the first spray trajectory.
2. The method of claim 1, wherein:
  with the plunger in the first open arrangement, the fluid has a first velocity distribution in the outlet channel; and with the plunger in the second open arrangement, the fluid has a second velocity distribution in the outlet channel different from the first velocity distribution.

3. The method of claim 2, wherein the first velocity distribution is biased toward the first side of the outlet channel and the second velocity distribution is biased toward the second side of the outlet channel.

4. The method of claim 1, wherein the outlet channel has a channel axis, the first spray trajectory having a first spray angle relative to a reference plane that is deeper than an angle between the channel axis and the reference plane, and the second spray trajectory having a second spray angle that is shallower than the channel axis.

5. The method of claim 1, wherein the moving step is performed based on at least one engine operating condition.

6. The method of claim 1, further comprising:
moving the plunger to a third open arrangement; and
directing fluid through the plunger in the third open arrangement and into the outlet channel to produce a third spray trajectory from the outlet channel;
wherein moving the plunger to the third open arrangement is performed based on at least one engine operating condition.

7. The method in claim 6, wherein with the plunger in the third open arrangement, the fluid has a third velocity distribution in the outlet channel.

8. The method in claim 7, wherein the third velocity distribution is balanced between the first side and the second side of the outlet channel.

9. The method of claim 6, wherein the outlet channel has a channel axis, and the third spray trajectory has a third spray angle that follows the channel axis.

10. The method of claim 1, wherein the first side of the outlet channel defines a first longitudinal position of the outlet channel and the second side of the outlet channel defines a second longitudinal position of the outlet channel which is different from the first longitudinal position.

11. A method comprising:
positioning a plunger in a first open arrangement in a body having an outlet channel;
directing fluid through the plunger in the first open arrangement, the fluid has a first velocity distribution, wherein the first velocity distribution is biased toward the first side of the outlet channel;
moving the plunger to a second open arrangement; and
directing fluid through the plunger in the second open arrangement, the fluid has a second velocity distribution in the outlet channel different from the first velocity distribution, wherein the second velocity distribution is biased toward the second side of the outlet channel.

12. The method of claim 11, wherein the moving step is performed based on at least one engine operating condition.

13. A method, comprising:
positioning a plunger in a first open arrangement in a body having an outlet channel, wherein the outlet channel has a channel axis;
directing fluid through the plunger in the first open arrangement and into a first side of the outlet channel to produce a first spray trajectory from the outlet channel, and the first spray trajectory having a first spray angle relative to a reference plane that is deeper than an angle between the channel axis and the reference plane;
moving the plunger to a second open arrangement; and
directing fluid through the plunger in the second open arrangement and into a second side of the outlet channel to produce a second spray trajectory from the outlet channel, and the second spray trajectory having a second spray angle that is shallower than the channel axis.

14. The method of claim 13, wherein the moving step is performed based on at least one engine operating condition.

* * * * *